United States Patent [19]
Tajima et al.

[11] Patent Number: 5,191,011
[45] Date of Patent: Mar. 2, 1993

[54] FILLED POLYACETAL RESIN COMPOSITIONS AND PROCESSES FOR MAKING THE SAME

[75] Inventors: Yoshihisa Tajima; Mitsuru Yokouchi; Masaru Miura, all of Shizuoka, Japan

[73] Assignee: Polyplastics Co., Ltd., Osaka, Japan

[21] Appl. No.: 899,167

[22] Filed: Jun. 15, 1992

Related U.S. Application Data

[63] Continuation of Ser. No. 661,347, Feb. 28, 1991, abandoned.

[30] Foreign Application Priority Data

Mar. 1, 1990 [JP] Japan ................................ 2-50258

[51] Int. Cl.$^5$ ............................................. C08L 7/00
[52] U.S. Cl. .................................. 524/512; 525/154; 525/163
[58] Field of Search ................ 524/512; 525/154, 163

[56] References Cited

U.S. PATENT DOCUMENTS

| | | | |
|---|---|---|---|
| 4,351,916 | 9/1982 | Kohan | 525/154 |
| 4,464,435 | 8/1984 | Hattori et al. | 428/409 |
| 4,814,397 | 3/1989 | Novak | 525/154 |
| 4,822,654 | 4/1989 | Takemura et al. | 524/512 |
| 4,873,282 | 10/1989 | Yui et al. | 524/512 |

FOREIGN PATENT DOCUMENTS 0202430 11/1986 European Pat. Off. .

*Primary Examiner*—Paul R. Michl
*Assistant Examiner*—Edward Cain
*Attorney, Agent, or Firm*—Nixon & Vanderhye

[57] ABSTRACT

Polyacetal compositions are made by melt-blending a polyacetal base resin A, a filler material B, and a thermoplastic acrylic resin C in weight ratios which satisfy the following formulas (1) and (2):

$$(B+C)/(A+B+C) = 0.03 \text{ to } 0.06 \qquad (1)$$

$$C/(B+C) = 0.05 \text{ to } 0.95 \qquad (2).$$

The thermoplastic acrylic resin C is most preferably selected from homopolymers of methyl methacrylate or copolymers which are mainly comprised of units derived from methyl methacrylate. The melt-blending of the polyacetal base resin A with the thermoplastic acrylic resin C is accomplished in the presence of a filler material B having a surface tension which is greater than that of the thermoplastic acrylic resin C at the melt-blending temperature. In this manner, a continuous phase of the thermoplastic acrylic resin is formed in a matrix of the polyacetal base resin such that the filler material is encapsulated in the continuous acrylic resin phase.

8 Claims, 2 Drawing Sheets

FILLED POLYACETAL RESIN COMPOSITIONS AND PROCESSES FOR MAKING THE SAME

This is a continuation of application Ser. No. 07/661,347, filed Feb. 28, 1991, now abandoned.

CROSS-REFERENCE TO RELATED APPLICATIONS

This application is related to copending and commonly owned U.S. patent application Ser. No. 07/605,730 filed on Oct. 31, 1990, now abandoned entitled "Filled Thermoplastic Resin Compositions Having an Interpenetrating Phase Forming a Three-Dimensional Network Structure and Melt-Blending Methods for Forming the Same", the entire content of which is expressly incorporated hereinto by reference.

FIELD OF INVENTION

The present invention generally relates to polyacetal resin compositions which include a filler material and to process for making the same. More specifically, the present invention relates to polyacetal resin compositions in which a thermoplastic acrylic resin has been melt-blended so as to form an interpenetrating network dispersed homogeneously throughout the polyacetal base resin.

BACKGROUND AND SUMMARY OF THE INVENTION

Polyacetal is a well known engineering resin which exhibits excellent chemical resistance properties, as well as balanced mechanical properties. Polyacetal resin has therefore been used in a variety of end-use applications. However, since polyacetal resins also tend to exhibit high coefficients of shrinkage and linear expansion during molding due to the high crystallinity of the resin, it is known to have fairly poor dimensional accuracy. In addition, the weather resistance and acid resistance properties of polyacetal resin are known to need improvements.

These disadvantageous properties of polyacetal thus make it difficult to use the resin in certain end-use applications, such as the material from which exterior components of automobiles and the like (which are exposed directly to atmospheric conditions) may be made. Although some attempts have been made to improve the weather resistance properties of polyacetal resin by blending an acrylic resin, such as polymethylmethacrylate (PMMA), with the polyacetal as a base resin, merely blending the acrylic resin with polyacetal has its own problems. That is, a blend of polyacetal resin and acrylic resin typically cannot be utilized as an exterior component (especially components that are large or complicated in shape) because the characteristic mechanical properties of the polyacetal resin (such as its impact resistance and tensile elongation properties) are impaired by the presence of the polymethylmethacrylate. Although it is not known precisely why such polyacetal property deterioration occurs, it is surmised that it probably occurs due to the poor dispersion of the polymethylmethacrylate in the polyacetal base resin. Moreover, blending polymethylmethacrylate resin with polyacetal base resins does not improve the dimensional accuracy, such as distortion and shrinkage during molding, to sufficient degrees. It is therefore towards solving these problems that the present invention is directed.

The present invention is broadly directed to polyacetal resin compositions and processes for making the same whereby a polyacetal base resin, a particulate filler material and an acrylic resin may be blended with one another under melt conditions and in certain specified amounts so as to improve the dispersion of the acrylic resin and filler throughout the polyacetal base resin. The present invention more specifically relates to polyacetal compositions whereby an interconnected network consisting essentially of a continuous phase of the acrylic resin is formed within the polyacetal base resin (which therefore forms a matrix for the continuous acrylic resin phase). The particulate filler material is dispersed homogeneously throughout the polyacetal base resin but is encapsulated within the continuous acrylic resin phase. In this connection, it is most preferred that the filler material exhibits a greater surface tension at melt-blending temperatures as compared to the surface tension of the acrylic resin forming the continuous phase in the polyacetal matrix base resin.

Further aspects and advantages of this invention will become more clear from the following detailed description of the preferred exemplary embodiments thereof.

BRIEF DESCRIPTION OF THE ACCOMPANYING DRAWINGS

In FIGS. 1(a) and 1(b), are schematic cross-sectional and perspective views, respectively, showing a typical particular dispersion within a thermoplastic matrix resin according to the prior art;

FIGS. 2(a) and 2(b), are a schematic cross-sectional and perspective view, respectively, showing a typical particulate dispersion of a thermoplastic acrylic resin and filler material within a polyacetal matrix base resin according to the present invention;

DETAILED DESCRIPTION OF THE PREFERRED EXEMPLARY EMBODIMENTS

Figure 1A:
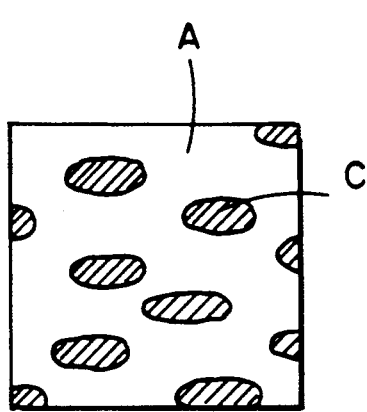
Figure 1B:
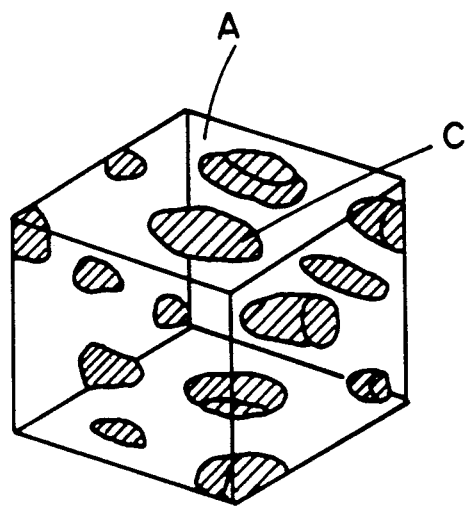

Accompanying FIGS. 1(a) and 1(b) show dispersion morphology in a conventional polymer blend system. In this regard, it can be seen that the additive resin (component C) is dispersed in the form of discreet unconnected particles or islands in a sea of matrix resin (component A). The additive resin is, moreover, present in relatively low amounts.

Figure 2A:
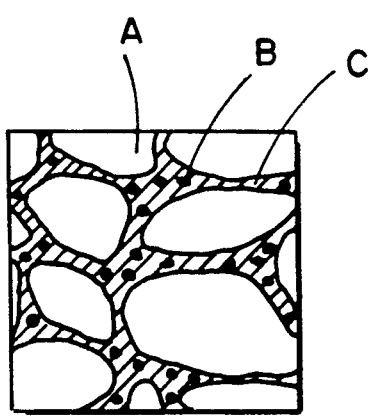
Figure 2B:
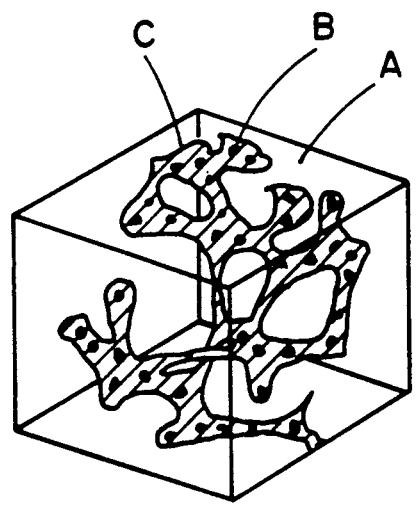

On the other hand, accompanying FIGS. 2(a) and 2(b) schematically show the morphology of the interpenetrating network structure according to the present invention. As can be seen, the filler material (component B) is essentially entirely encapsulated within the three-dimensional interconnected network formed by the thermoplastic acrylic resin (component C). Despite the relatively low content, the acrylic resin C forms a continuous phase within the continuous phase of the matrix polyacetal resin (component A). Thus, the acrylic resin A forms a complex interpenetrating network structure in which the continuous phases of both the acrylic resin and the matrix polyacetal resin are entangled with one another.

As used herein and in the accompanying claims, the terms "network", "network structure", and like terms are each intended to refer to a melt-blended resin morphology having at least two continuous phases, whereby one phase is comprised of a thermoplastic matrix polyester resin, and the other phase is comprised of imbedded regions of a thermoplastic acrylic resin within the matrix resin, which imbedded regions are interconnected by means of fibrils, rivulets or the like of the acrylic resin. Thus, it will be appreciated that both phases will form a mutually entangled three-dimensional network.

The compositions of this invention are at least tertiary blends. That is, according to the present invention at least three components—that is, a matrix polyacetal base resin A, a particulate filler material B, and a thermoplastic acrylic resin C are melt-blended to disperse the acrylic resin in the matrix polyacetal resin in such a manner that a complex three-dimensional network is formed, and in such a manner that the acrylic resin encapsulates essentially all of the filler material. In this manner, the non-thermoplastic filler is dispersed homogeneously throughout the matrix polyacetal resin without physically being encapsulated thereby or imbedded therewithin. In other words, the non-thermoplastic filler particles are interconnected with one another through the three-dimensional network formed by the additive resin.

The present invention utilizes surface tension differences among the three components A, B and C (i.e., the matrix polyacetal resin, the filler material and the thermoplastic acrylic resin, respectively) so that the acrylic resin encapsulates the filler material, and so that the filler material is homogeneously dispersed throughout the acrylic resin (i.e., is essentially absent from the matrix polyacetal resin phase). In this connection, the surface tension of the filler material is at least greater than the surface tension of the acrylic resin component. Preferably, at least a 2 dyn/cm difference in surface tension exists, i.e. the surface tension of the filler is at least 2 dyn/cm greater than the surface tension of the acrylic resin component. In this manner, the particles of the filler component B may be encapsulated by the three-dimensional network that is formed by the acrylic resin component C.

It is believed that the phenomenon described above occurs due to the fact that the surface free energy of each component per unit volume is less in the state whereby the component C encapsulates the component B as compared to other states that the components may assume. As a result, the system will seek its most stable form—i.e., the component C will encapsulate component B. Thus, the mechanism whereby the component B is encapsulated by the component C is due to the surface tension differences of the components in the system. More specifically, when there is a difference in the surface tension between the components B and C, as described above, the system will assume a state whereby the component C encapsulates the component B so as to achieve the most stable form (i.e., minimize the surface free energy).

The polyacetal resin A, filler material B and thermoplastic acrylic resin C must also be used in amounts which satisfy the weight ratios of the following formulas (1) and (2):

$$(B+C)/(A+B+C) = 0.03 \text{ to } 0.6 \quad (1)$$

$$C/(B+C) = 0.05 \text{ to } 0.95 \quad (2).$$

The polyacetal base resin that may be used in the present invention is a polymeric compound comprised principally of oxymethylene ($-CH_2O-$) groups and thus may be any polyoxymethylene homopolymer, or a polyoxymethylene copolymer, terpolymer and block copolymer containing a small amount of other constituent units in addition to the oxymethylene groups. The molecule of the polyacetal base resin may have either a linear structure as well as a branched or crosslinked structure. The degree of polymerization of the polyacetal base resin is not particularly limited, but is sufficiently large so that the resin is normally solid (e.g. molecular weights of up to 200,000).

The thermoplastic acrylic resin used as the component C in the present invention include homopolymers of acrylic acid and its esters (such as methyl acrylate, ethyl acrylate, n-propyl acrylate, isopropyl acrylate, n-butyl acrylate, n-hexyl acrylate and n-octyl acrylate); homopolymers of methacrylic acid and its esters (such as methyl methacrylate, ethyl methacrylate, n-propyl methacrylate, isopropyl methacrylate, n-butyl methacrylate, isobutyl methacrylate, n-amyl methacrylate and n-octyl methacrylate); and copolymers of them with styrene, acrylonitrile, butadiene or isoprene. Among them, methyl methacrylate homopolymer and copolymers comprising methyl methacrylate as the main component and an acrylic ester, methacrylic ester, acrylic acid, methacrylic acid, styrene or acrylonitrile are preferred. From the viewpoint of processability, a straight chain polymer having a low viscosity is preferred.

As noted briefly above, the filler material that may be used as component B in the compositions of the present invention must be selected so as to have a surface tension at the melt-blending temperatures which is at least greater than the surface tension of the thermoplastic acrylic resin component C. Most preferably, the filler material will exhibit a surface tension which is greater than the surface tension of the thermoplastic acrylic resin by at least 2 dyn/cm.

The surface tensions expressed herein and in the accompanying claims are measured at the melt-blending temperature of the resins. In this connection, surface tensions of thermoplastic resins can be determined by the well known "pendant drop method" at the melt-blending temperature. The term "pendant drop method" as used herein is intended to mean a method which comprises standing a tube upright, and determining the surface tension of the liquid placed in the tube based upon the shape of a droplet hanging down from the end of the tube. In the case of components which do not melt at the melt-blending temperature (e.g., solid particulate non-thermoplastic filler materials) the critical surface temperature is determined by the Zisman plot of the contact angle.

The surface tension of the polyacetal base resin component A at 190° C. is typically between about 18 to about 23 dyn/cm, whereas the surface tension of the thermoplastic acrylic resin component C is at least 23 dyn/cm. For example, the surface tension of polymethylmethacrylate is about 28 dyn/cm. Therefore, the surface tension of the particulate filler component B must be greater than the surface tension value of the acrylic resin component C when they are blended at 190° C.

As indicated previously, the proportions (by weight) of the three components A, B and C in the compositions of the present invention must satisfy the following conditions:

$$(B+C)/(A+B+C) 0.03 \text{ to } 0.6 \quad (1)$$

$$C/(B+C) = 0.05 \text{ to } 0.95 \quad (2).$$

From the viewpoint of maintaining the characteristic features of the polyacetal resin which are intended in the present invention and for the purpose of forming a network structure with a small amount of the acrylic resin component C, the effect of the present invention is especially significant when the amount of components B+C is up to about 60% by weight based on the total weight of components A+B+C, particularly up to about 40% by weight. In order to essentially encapsulate all of the particulate filler material by the acrylic resin component C, the ratio of C/(B+C) is preferably maintained as high as possible.

The preferred weight ratios are therefore within the following ranges:

$$(B+C)/(A+B+C) = 0.05 \text{ to } 0.4 \text{ and;}$$

$$C/(B+C) = 0.25 \text{ to } 0.95.$$

Virtually any filler material may be used as component B in the compositions of the present invention provided it satisfies the above-noted conditions in terms of the surface tension it exhibits at melt-blending temperatures. In this connection, the filler material may be selected from among organic and inorganic filler materials. If the filler material does not exhibit the requisite surface tension naturally, it may be treated with any suitable surfactant so as to adjust the surface tension to within suitable ranges.

The particulate filler material used as component B in the compositions of the present invention is preferably one having a mean particle diameter of between about 0.05 to 50 $\mu$m, particularly between about 0 1 to 10 $\mu$m. The smaller the particle diameter of the filler material, the more advantageous it is to form a fine network structure in the continuous acrylic resin phase.

The filler material as component B can be virtually any fibrous, particulate or flaky inorganic or organic filler typically employed in engineering resins and may be selected in dependence upon the intended end use application for the composition and/or intended properties to be attained through the use of the filler.

Specific examples of inorganic fibrous filler material include fibers of glass, asbestos, silica, silica-alumina, zirconia, boron nitride, silicon nitride, boron and potassium titanate. Examples of particulate filler materials include carbon black, graphite, silica, quartz powder, glass bead, milled glass fiber, glass balloon, glass powder, silicates such as calcium silicate, aluminum silicate, kaolin, talc, clay, diatomaceous earth and wollastonite, metallic oxides such as iron oxide, titanium oxide, zinc oxide, antimony trioxide and alumina, metal carbonates such as calcium carbonate and magnesium carbonate, metal sulfates such as calcium sulfate and barium sulfate, and other various materials such as ferrite, silicon carbide, silicon nitride and boron nitride. Examples of the flaky filer include mica and glass flake. These inorganic fillers may be used alone or in a combination of two or more of them.

Examples of the organic filler materials include heat-resistant fibrous fillers, such as the fibers of aromatic polyesters, liquid crystal polymers, aromatic polyamides, and aromatic polyimides, and particulate fillers comprising thermoplastic resins, thermosetting resins or the like. Examples of particulate organic fillers include phenolic resins, polystyrene resins, acrylic resins, polyethylene resins, polyamide resins, fluororesins, melamine resins, polymethyl methacrylate resins, epoxy resins, olefin-acrylic acid copolymer resins or the like. These particulate organic filler materials may be used alone or in combination of two or more of the same. Although there is no particular limitation on the particle size of the filler materials (either organic or inorganic) that that are employed, the mean particle diameter is preferably between 0.01 to 20 $\mu$m so as to be more readily dispersed when melt-blended.

Conventional additives known in the art, e.g., lubricants, nucleating agents, dyes and pigments, mold-release agents, antioxidants, heat stabilizers, weather (light) stabilizers, reinforcing agents, hydrolysis stabilizers, thermoplastic resins, etc., may be incorporated into the thermoplastic interpenetrating network structure of the present invention for the purpose of imparting desired characteristics.

In the present invention, the three components, i.e., components A, B and C, may be melt-blended by customary methods which include melt kneading the thermoplastic matrix resin A with the thermoplastic additive resin C while simultaneously adding the filler component B thereinto. That is, the present invention is especially significant in that a thermoplastic interpenetrating network structure can be formed using conventional melt-blending techniques and thus specialized methods and/or techniques associated with the prior art are unnecessary. For example, the components A, B and C may be melt-blended by heating and kneading for at least 30 seconds. Other components may be incorporated thereinto so they are melt-blended simultaneously with or separately of the components A, B and C. In this regard, the Components A, B and C may be mixed homogeneously together by means of a mixer (such as a tumbler of a Henshel mixer) with the mixture then being fed into a single or twin screw extruder so as to melt-knead the components and form pellets thereof. These pellets may then be employed in injection molding operations, for example.

It is desirable to conduct the melt-blending at melt temperatures for the thermoplastic components such that a shear force of at least about 40 sec$^{-1}$ is imparted to the resin melt. The shear force is more preferably between 100 and 500 sec$^{-1}$. The melt-blending temperature is preferably between about 5° to 100° C., more preferably between about 10° to 60° C., greater than the melt temperature of the resin component having the greater melting point. Melt-blending at excessively high temperatures may result in decomposition of the resin components and/or abnormal reactions occurring within the extruder.

The resin components are subjected to melt-blending for any period of time sufficient to homogeneously disperse the acrylic resin component throughout the polyacetal base resin. Typically, however, melt-blending of the components will proceed for a time period from between about 30 seconds to about 15 minutes, and more preferably between about 1 minute to about 10 minutes.

As will now be understood, the polyacetal resin compositions of the present invention have an acrylic resin dispersed homogeneously throughout the polyacetal base resin in the form of an interconnected network consisting essentially of a continuous phase in which the filler material is encapsulated. The compositions of this invention can, moreover, be prepared by relatively simple procedures. Thus, unlike the particle dispersions of the prior art compositions, the advantageous characteristics of both the acrylic resin and the polyacetal resin in the compositions of this invention can be maintained. As a result, the resin compositions of this invention may be used to form molded articles of exceptionally high dimensional accuracy while maintaining the other beneficial physical and chemical properties of acetal resin generally. Thus, the compositions of this invention may usefully be employed to form molded automotive components, particularly those that may be employed on an automobile's exterior.

EXAMPLES

The present invention will now be described in more detail by way of the following non-limiting Examples.

The following evaluation techniques were employed:

(i) Surface Tension Measurements

The surface tension of each of the polyacetal resin and the thermoplastic resin polyurethane was measured according to the pendant drop method (a method described on pages 78 and 79 of "Shin Jikken Kagaku Koza", Vol. 18, "Kaimen to Koroido" (1977) published by Maruzen Co., Ltd. incorporated expressly hereinto by reference in an atmosphere of 190° C. by making use of an automatic surface tensio-meter PD-Z manufactured by Kyowa Interface Science Co., Ltd. The surface tensions of the polyacetal resin and the thermoplastic resin polyurethane were 21 dyn/cm and 28 dyn/cm, respectively.

The surface tension of the acrylic rubber particles was measured by fabricating the acrylic rubber particles into a film at 200° C. by using a press and determining the critical surface tension and the temperature coefficient according to the contact angle method (a method described on pages 93 and 106 of "Shin Jikken Kagaku Koza", Vol. 18, "Kaimen to Koroido" (1977) published by Maruzen Co., Ltd.) by making use of an automatic contact angle measuring apparatus CA-Z manufactured by Kyowa Interface Science Co., Ltd. The results of the measurements were as follows, with the surface tension value of the acrylic rubber particles at 190° C. being 30 dyn/cm:

surface tension at 25° C.: 42 dyn/cm
surface tension at 60° C.: 39.5 dyn/cm
surface tension at 80° C.: 38 dyn/cm
temperature gradient $(-dr/dT) = 0.072$

(ii) Determining Presence of Interpenetrating Network Structure

Figure 3:
FIG. 3 is an optical microphotograph showing the particulate structure of a molded article formed of the resin composition described in the following Comparative Example 3.

A molded piece having a size of 10×10×3mm was placed in a hydrochloric acid-methanol solution (32 N hydrochloric acid : methanol=1:3 (vol)) and heated under reflux at 80° C. for 12 hr to observe the morphological change with the naked eye and under an optical microscope and an electron microscope. Specifically, the matrix resin comprising a polyacetal resin was decomposed with an acid and eluted. and the dispersion state was observed for the thermoplastic polyurethane and the acrylic rubber particle which will not bring about any morphological change under this condition. As with the prior art, if the thermoplastic polyurethane is dispersed in particulate form, the molded piece cannot retain its form and a (fine) particulate polyurethane is observed with the naked eye or under an optical microscope (see the optical microphotograph of Comparative Example 3 shown in FIG. 3).

Figure 4:
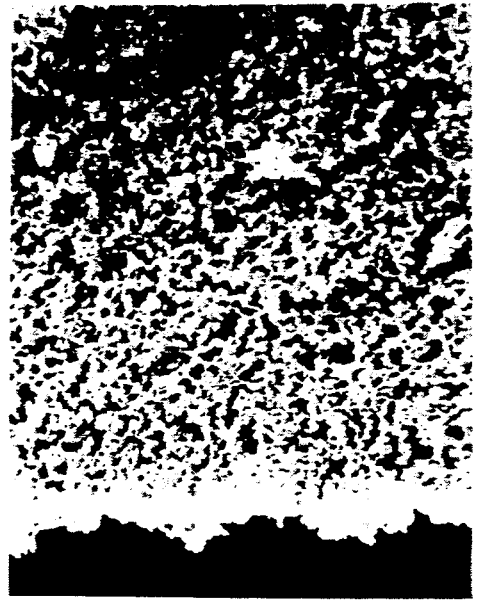
FIG. 4 is an optical photomicrograph of a molded article formed of the resin composition described in the following Example 1.
Figure 5:
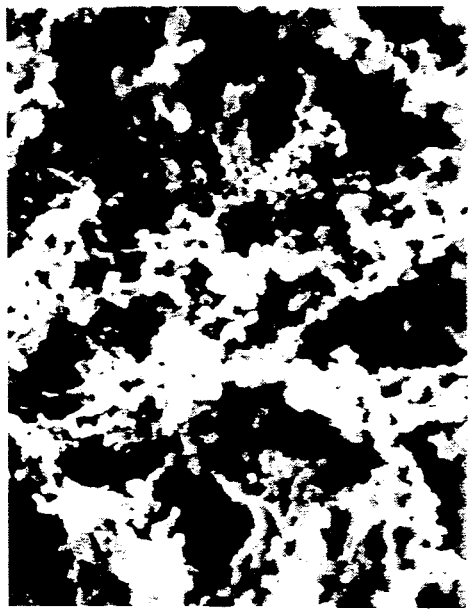
FIG. 5 is a scanning electronmicroscope showing the interpenetrating continuous phase of the thermoplastic acrylic resin within a polyacetal matrix base resin for the composition of the following Example 1.

By contrast, when the thermoplastic resin and the acrylic rubber assume a thermoplastic interpenetrating network structure according to the present invention, the molded piece retains its form and is observed with the naked eye or under an optical microscope (see the optical microphotograph of Example 1 shown in FIG. 4). Further, the thermoplastic interpenetrating network structure can be more distinctly confirmed when the molded piece is observed in a magnified state under a scanning electron microscope (see the electron microphotograph of Example 1 shown in FIG. 5).

The morphology of the particulate dispersion and the thermoplastic interpenetrating network structure were quantitatively evaluated by treating the molded piece by the above-described method, filtering the treated piece through a 12-mesh sieve to determine the oversize (% by weight). The portion of particulate dispersion passes through the sieve and does not remain on the sieve. The portion of the thermoplastic interpenetrating network structure however remains on the sieve. Therefore, the oversize (% by weight) refers to the weight of the (B+C) portion in the thermoplastic interpenetrating network structure.

(iii) Mechanical Strength Measurement

The Izod impact strength (notched) of the molded piece was measured according to ASTM D 256, while the tensile strength and tensile elongation thereof were measured according to ASTM D638.

(iv) Coefficient of Linear Expansion of Molding Piece

The coefficient of linear expansion of the molding pieces was determined according to ASTM D696.

(v) Determination of Acid Resistance

Crack formation on the surface of the molding pieces was macroscopically examined after the molding piece was immersed in a 20% aqueous sulfuric acid solution at 20° C. for 180 days.

EXAMPLE 1

Polyacetal resin (A) (Duracon, a product of Polyplastics Co., Ltd.), methyl methacrylate copolymer resin (C) (a product of Sumitomo Chemical Co., Ltd.) and acrylic rubber particles (B) having a mean particle diameter of 0.5 μm (a product of Mitsubishi Rayon Co., Ltd.) each having a surface tension (at 190° C.) specified in Table 1 were mixed together in the weight ratios specified in Table 1. These components were melt-kneaded with a 30 mm twin-screw extruder at a rotational speed of 80 rpm (shear rate: about 100 sec$^{-1}$) and at a preset temperature of 190° C. to form pellets. The pellets were then molded into tensile test pieces with a molding machine manufactured by Nissei Jushi Kogyo K.K. at a barrel temperature of 190° C. and a mold temperature of 80° C. The test pieces were evaluated to obtain the results given in Table 1.

COMPARATIVE EXAMPLES 1 to 3

Molding pieces were prepared and evaluated in the same manner as Example 1 from polyacetal resin A alone, as well as a blend of polyacetal resin A and methyl methacrylate copolymer resin but without acrylic resin rubber particles as component B. The results are also reported in Table 1.

EXAMPLES 2 and 3 and COMPARATIVE EXAMPLE 4

Molding pieces were prepared in the same manner as that of Example 1, except that the acrylic rubber particles (component B) were replaced with melamine resin particles having a mean particle diameter of 1 μm (a product of Nippon Shokubai Kagaku Kogyo Co., Ltd.), calcium carbonate having a mean particle diameter of 10 μm (a product of Toyo Fine Chemical Co., Ltd.) or a polydimethylsiloxane particle having a mean particle diameter of 5 μm (a product of Toray Silicone Co., Ltd.) each having a surface tension (at 190° C.) as specified in Table 1. These molding pieces were evaluated in the same manner as that of Example 1 and the results of this evaluation are reported in Table 1.

EXAMPLES 4 to 9 and COMPARATIVE EXAMPLES 5 to 8

Molding pieces were prepared and evaluated in the same manner as that of Example 1, except that the ratio of the methyl methacrylate copolymer resin to the acrylic rubber particles was altered as specified in Table 2. The results of this evaluation are given in Table 2.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making a polyacetal resin composition comprising melt-blending at a melt-blending temperature a polyacetal base resin A, a filler material B, and a thermoplastic acrylic resin C in weight ratios which satisfy the following formulas (1) and (2):

$$(B+C)/(A+B+C) = [0.03 \text{ to } 0.6]0.05 \text{ to } 0.4 \quad (1)$$

$$C/(B+C) = [0.05 ]0.25 \text{ to } 0.95 \quad (2),$$

wherein
said method includes selecting the filler material B and the thermoplastic acrylic resin C such that the filler material B has a surface tension which is at least 2.0 dyn/cm greater than the surface tension of the acrylic resin C at the melt-blending temperature, and wherein
said polyacetal resin A, said filler material B, and said thermoplastic acrylic resin C are simultaneously melt-blended to thereby cause, during the melt-blending step, the thermoplastic acrylic resin C to form a continuous interconnected network within the polyacetal resin with the filler material B encapsulated within the interconnected network of the acrylic resin C,

TABLE 1

| | | | Surface tension (dyn/cm) | Example 1 | Example 2 | Example 3 | Comparative Example 1 | Comparative Example 2 | Comparative Example 3 | Comparative Example 4 |
|---|---|---|---|---|---|---|---|---|---|---|
| A | Polyacetal resin | (wt. %) | 21 | 80 | 80 | 80 | 100 | — | 80 | 80 |
| C | Methyl methacrylate copolymer resin | (wt. %) | 28 | 15 | 15 | 15 | — | 100 | 20 | 15 |
| B | Acrylic rubber particle | (wt. %) | 30 | 5 | — | — | — | — | — | — |
| | Melamine resin particle | (wt. %) | 43 | — | 5 | — | — | — | — | — |
| | Calcium carbonate particle | (wt. %) | 65 | — | — | 5 | — | — | — | — |
| | Polydimethylsiloxane particle | (wt. %) | 10 | — | — | — | — | — | — | 5 |
| | Change in shape after decomposition with acid | | | shape un-changed | shape un-changed | shape un-changed | entirely dec. | shape un-changed | shape un-retained | shape un-retained |
| | Amount of resin remaining after decomposition with acid (wt. %) | | | 19 | 15 | 12 | 0 | 100 | 0 | 0 |
| | Notched Izod impact strength (kgf cm/cm) | | | 6.4 | 5.6 | 5.9 | 6.0 | 1.5 | 3.2 | 1.5 |
| | Tensile elongation (%) | | | 75 | 52 | 41 | 55 | 4 | 25 | 23 |
| | Coefficient of linear expansion (cm × $10^{-5}$/cm · °C.) | | | 7 | 7 | 7 | 10 | 7 | 9 | 9 |
| | Acid resistance (crack formation) | | | no | no | no | yes | no | no | no |

TABLE 2

| | | | Surface tension (dyn/cm) | Example 4 | Example 5 | Example 6 | Example 7 | Example 8 | Example 9 | Comparative Example 5 | Comparative Example 6 | Comparative Example 7 | Comparative Example 8 |
|---|---|---|---|---|---|---|---|---|---|---|---|---|---|
| A | Polyacetal resin | (wt. %) | 21 | 95 | 95 | 95 | 60 | 60 | 60 | 95 | 95 | 60 | 60 |
| C | Methyl methacrylate copolymer resin | (wt. %) | 28 | 4.5 | 3.75 | 1.25 | 36 | 30 | 4 | 5 | — | 40 | — |
| B | Acrylic rubber particle | (wt. %) | 30 | 0.5 | 1.25 | 3.75 | 4 | 10 | 36 | — | 5 | — | 40 |
| | Change in shape after decomposition with acid | | | shape unchanged | | | | | | shape unretained | | | |
| | Amount of resin remaining after decomposition with acid (wt. %) | | | 4.5 | 4.7 | 4.3 | 38 | 35 | 20 | 0 | 0 | 0 | 0 |
| | Notched Izod impact strength (kgf cm/cm) | | | 7.1 | 7.3 | 6.8 | 4.0 | 4.5 | 3.7 | 4.8 | 3.9 | 1.3 | 2.9 |
| | Tensile elongation (%) | | | 80 | 84 | 71 | 37 | 35 | 49 | 42 | 48 | 21 | 25 |
| | Coefficient of linear expansion (cm × $10^{-5}$/cm · °C.) | | | 7 | 7 | 8 | 7 | 7 | 8 | 10 | 10 | 7 | 9 |
| | Acid resistance (crack formation) | | | no | no | no | no | no | no | no | yes | no | yes | wherein
said filler material B is selected from the group consisting of acrylic and melamine resins; and
wherein
said thermoplastic acrylic resin C is a homopolymer of methyl methacrylate or a copolymer which is mainly comprised of units derived from methyl methacrylate.

2. A method as in claim 1, wherein the thermoplastic acrylic resin C has a surface tension of at least 23 dyn/cm.

3. A polyacetal resin composition comprising a melt-blend of a polyacetal base resin A, a filler material B, and a thermoplastic acrylic resin C in weight ratios which satisfy the following formulas (1) and (2):

$$(B+C)/(A+B+C) = [0.03 \text{ to } 0.6]0.05 \text{ to } 0.4 \quad (1)$$

$$C/(B+C) = [0.5]0.25 \text{ to } 0.95 \quad (2),$$

wherein said acrylic resin C is present within said polyacetal resin A in the form of an interconnected network consisting essentially of a continuous phase of the acrylic resin, and wherein said filler material B exhibits a surface tension which is at least 2.0 dyn/cm greater than the surface tension of said acrylic resin C such that said filler material B is homogeneously dispersed throughout and encapsulated within said continuous phase of the acrylic resin C, wherein said filler material B is selected from the group consisting of acrylic and melamine resins; and wherein said thermoplastic acrylic resin C is a homopolymer of methyl methacrylate or a copolymer which is mainly comprised of units derived from methyl methacrylate.

4. A polyacetal composition as in claim 3, wherein the thermoplastic acrylic resin C has a surface tension of at least 23 dyn/cm.

5. An article of manufacture which includes a melt-blended resin composition as in claim 3.

6. A molded article which consists essentially of a melt-blended resin according to claim 3.

7. A polyacetal resin composition as in claim 3, wherein said filler material B is particulate acrylic rubber.

8. A polyacetal resin composition as in claim 2, wherein said particulate acrylic rubber has a mean particle diameter of between about 0.05 to 50 μm.

* * * * *

UNITED STATES PATENT AND TRADEMARK OFFICE
CERTIFICATE OF CORRECTION

PATENT NO. : 5,191,011
DATED : March 2, 1993
INVENTOR(S) : TAJIMA et al

It is certified that error appears in the above-identified patent and that said Letters Patent is hereby corrected as shown below:

Column 1, line 22, change "process" to --processes--.

Column 2, line 27, change "in" to --In--.

Column 3, line 30, delete "additive" and insert --thermoplastic acrylic--.

Column 4, line 19, change "include" to --includes--.

Column 5, line 6, change "C)0.03 to 0.6" to --C=0.03 to 0.6--;
      line 66, change "filer" to --filler--;
      line 68, change "them" to --the same--.

Column 7, line 66, after "eluted" delete the period (.) and insert a comma (,);
      line 68, delete "will not bring" and insert --did not undergo--.

Column 8, line 1, delete "about";
      line 24, after "of" insert --the--.

Column 10, Claim 1, formula (1), delete "[0.03 to 0.6]";
      Claim 1, formula (2), delete "[0.05]".

UNITED STATES PATENT AND TRADEMARK OFFICE
CERTIFICATE OF CORRECTION

PATENT NO. : 5,191,011
DATED : March 2, 1993
INVENTOR(S) : TAJIMA et al

It is certified that error appears in the above-indentified patent and that said Letters Patent is hereby corrected as shown below:

Column 11, Claim 3, formula (1), delete "[0.03 to 0.6]";
Claim 3, formula (2), delete "[0.05]".

Signed and Sealed this

Fourteenth Day of December, 1993

*Attest:*

BRUCE LEHMAN

*Attesting Officer*   Commissioner of Patents and Trademarks